No. 886,535. PATENTED MAY 5, 1908.
W. M. & R. J. McCURDY.
MACHINE FOR CATCHING BOLL WEEVIL.
APPLICATION FILED OCT. 28, 1907.
3 SHEETS—SHEET 1.
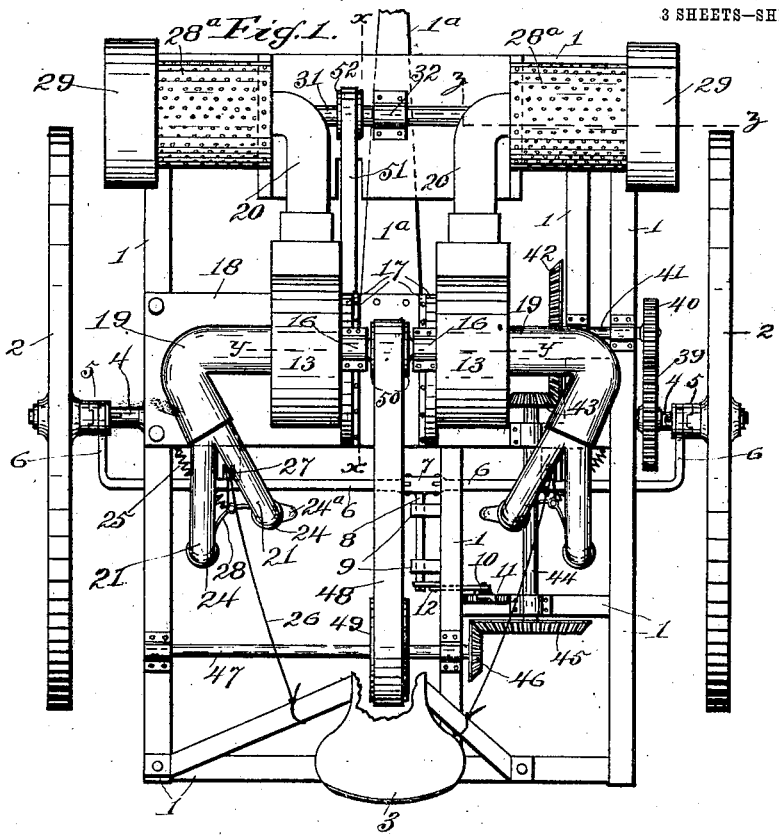
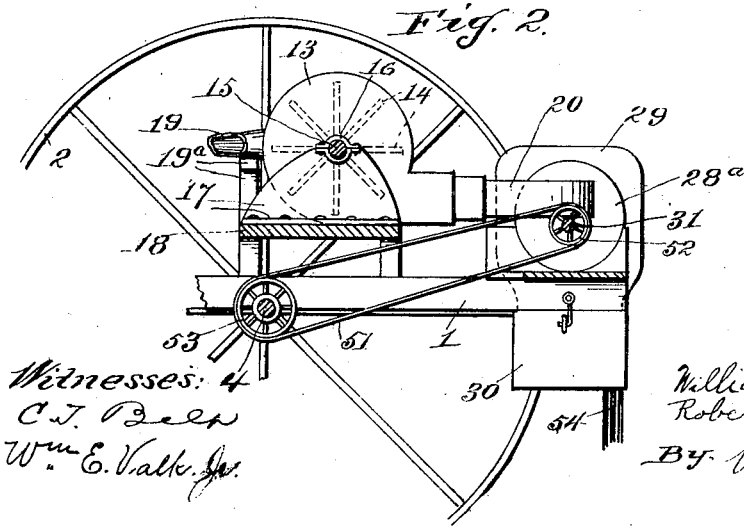
Witnesses:
C. J. Belt
Wm. E. Valk, Jr.
Inventors
William M. McCurdy
Robert J. McCurdy
By W. H. Wills
Attorney.

No. 886,535. PATENTED MAY 5, 1908.
W. M. & R. J. McCURDY.
MACHINE FOR CATCHING BOLL WEEVIL.
APPLICATION FILED OCT. 28, 1907.
3 SHEETS—SHEET 2.
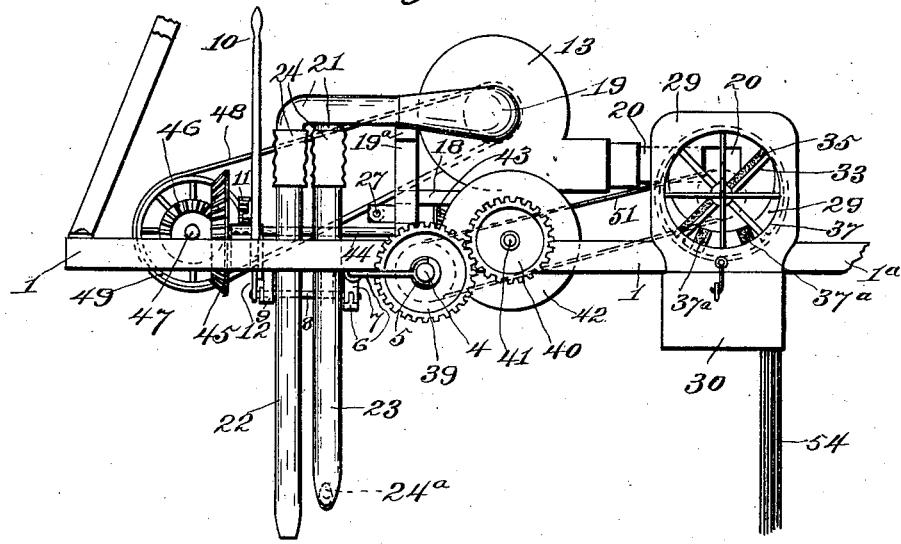
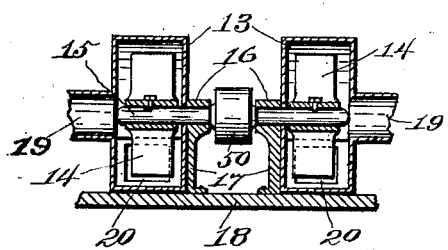
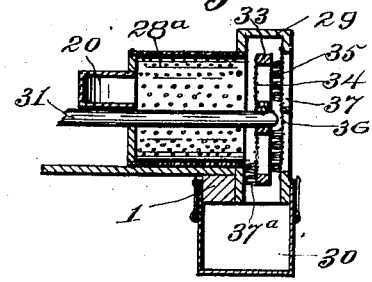

No. 886,535.
PATENTED MAY 5, 1908.
W. M. & R. J. McCURDY.
MACHINE FOR CATCHING BOLL WEEVIL.
APPLICATION FILED OCT. 28, 1907.
3 SHEETS—SHEET 3.
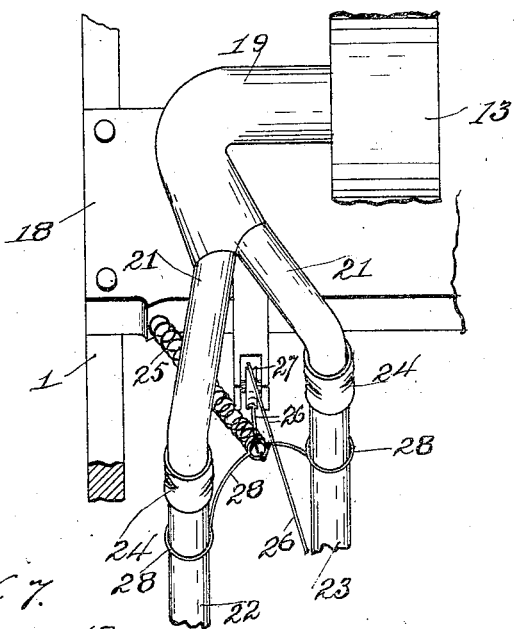
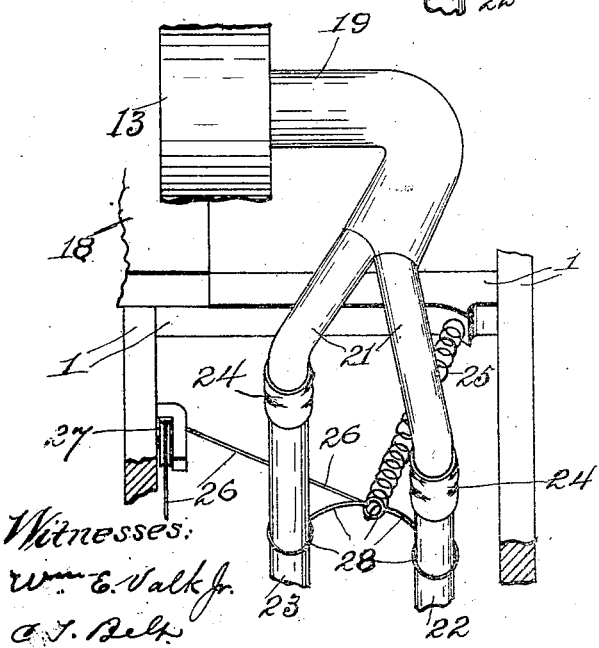

UNITED STATES PATENT OFFICE.

WILLIAM M. McCURDY AND ROBERT J. McCURDY, OF COUSHATTA, LOUISIANA.

MACHINE FOR CATCHING BOLL-WEEVIL.

No. 886,535.     Specification of Letters Patent.     Patented May 5, 1908.

Application filed October 28, 1907. Serial No. 399,537.

*To all whom it may concern:*

Be it known that we, WILLIAM M. MC-CURDY and ROBERT J. McCURDY, citizens of the United States, residing at Coushatta, in the parish of Red River and State of Louisiana, (whose post-office address is the same,) have invented certain new and useful Improvements in Machines for Catching Boll-Weevil, of which the following is a specification.

This invention relates to insect catchers and destroyers, and has special reference to a machine for catching boll weevil.

The object of the invention is to provide a sulky machine adapted to be drawn through a cotton field for the purpose of removing boll weevil from the cotton plants and catching such insects in the machine for destroying them.

A further object of the invention is to provide in a machine for catching insects, certain devices operated by the sulky-wheels of the machine as it is drawn through the cotton field or other field of plants having boll weevil or other insects thereon, for removing such insects.

A still further object of the invention is to provide in an insect catching machine, a suction apparatus into which and from which the insects are discharged, and means for operating such apparatus from the wheel-axle of the machine as the latter is drawn through a field of plants having insects thereon.

The object still further of the invention is to provide a straddle-row sulky with apparatus for removing boll weevil from plants by pneumatic suction, and to provide special means operated by the draft of the sulky for operating the said suction apparatus.

The object still further of the invention is to provide a special pneumatic suction apparatus having insect induction pipes, and insect discharge pipes, leading into deposit boxes or receptacles carried with such apparatus by a straddle-row sulky.

Other objects, advantages and improved results are attainable in and through the special construction and arrangement of parts hereinafter to be more fully described and particularly pointed out in the claims to follow.

In the accompanying drawings forming part of this application: Figure 1 is a top plan view showing the invention in condition for use, with the sulky-tongue and seat partly broken away. Fig. 2 is a sectional view on the line x—x, Fig. 1. Fig. 3 is a side elevation with the sulky-seat, wire-gauze and wheels removed. Fig. 4 is a detail section on the line y—y, Fig. 1. Fig. 5 is a detail section on the line z—z, Fig. 1. Figs. 6 and 7 are detail perspective views (partly broken away) of the suction pipes and their controlling devices.

The sulky comprises the usual frame 1, tongue 1ª, wheels 2, seat 3, and axle 4. The axle 4 is provided with clutches 5, operated by a pair of clutch-bars 6, pivoted to the ends of a cross-head 7 having a rod 8 adapted to be turned in hangers 9 by a suitable hand-lever 10, controlled by a pawl and ratchet 11, and connected to the rod 8 by links 12. It is obvious that by working the hand-lever the rod 8 is turned which turns the cross-heads 7 to swing the clutch-bars 6 and thereby slide the clutches 5 in and out of mesh with the wheel-hubs.

The suction apparatus for drawing boll weevil from cotton plants consists of a pair of fan-casings 13, a pair of fans 14, secured to and revolved by a shaft 15, journaled in bearings 16 of a pair of plates 17, secured to the sulky-bed 18; an induction pipe 19 for each fan-casing, a discharge pipe 20, from each fan-casing, branch pipes 21 extended from the pipes 19, and suction pipes 22 and 23 suspended from the branch pipes on each side of the machine, by flexible pipe-couplings 24. The pipes 19 are supported from the bed by standards 19ª. The pipes 22 and 23 are arranged in pairs, one pipe (22) of each pair reaching to near the ground and the other pipe (23) of each pair being shorter and having an inturned end 24ª. Flexible movement of the pipes 22 and 23 is controlled by spiral springs 25, and hand cords 26 working through sheaves 27, and attached to wires 28 secured to the pipes 22 and 23. The said springs limit the backward movement of the pipes 22 and 23 and the latter may be raised and swung forward by pulling the hand-cords 26. This arrangement and operation is desirable owing to the irregularity and variations in height of the plants and by reason of the locality of the boll weevil, and for the purpose of lifting the suction pipes when the suction apparatus is not in operation.

The boll weevil are carried from the fan-casings 13 by the pipes 20 into a pair of finely perforated drums 28ª, whence they are discharged through the drum-heads 29, into catch boxes 30, hooked to and depending from the drum-heads 29. A shaft 31 journaled at 32 extends through the drums 28ª, and each end of the shaft 31 is provided with a wheel 33 revolved in the drum-heads 29, and having a wire-gauze 34 on one side and brushes 35 on the other side, such brushes work against a wire gauze 36 which covers the opening 37 in the outer end of the drum-heads to dislodge any weevil that may be on the gauze 36; and the wheel gauze 34 works against stationary brushes 37ª for the same purpose, so that no weevil may lodge on the drum-heads, or on the end of the drums.

The mechanism for operating the fan-shaft 15, and the drum-shaft 31 from the sulky-axle 4, comprises a gear 39 fixed to the axle, a gear 40 meshing with the gear 39 and fixed to a shaft 41, having a bevel-gear 42 meshing with a pinion 43 on a shaft 44, which has a bevel-gear 45 meshing with a pinion 46 on a shaft 47, a belt 48 from a pulley 49 on the shaft 47 to the pulley 50 drives the fan-shaft 15, and a belt 51 from a pulley 53 on the axle 4, to a pulley 52 on the drum-shaft 31, drives this shaft. A drag composed preferably of leather strands 54 depends from the front of the sulky-frame in the path of the suction-pipes, for the purpose of brushing the weevil from the cotton plants and agitating them, so that they may be more conveniently caught by the suction-pipes. The axle 4 being coupled to the sulky-wheels, it is obvious that as the machine is driven through a field of cotton (straddle row) the driving mechanism is operated from said axle, the weevil being disturbed by the drag are drawn into the suction pipes to the fan casings and thence through the drums and drum-heads into the catch-boxes.

Having thus described our invention what we claim as new and desire to secure by Letters Patent is:

1. In a boll weevil catching machine, the combination, with suction apparatus, of a pair of drums each having a drum-head through which the weevil are driven from the drums for removal, and means for operating the apparatus from the axle of the machine.

2. In a boll weevil catching machine, the combination, with suction apparatus, of a pair of drums each having a drum-head through which the weevil are driven from the drums, a shaft extending through the drums, a wheel on each end of the shaft for directing the weevil from the drum-heads, means for operating the apparatus from the machine axle and means for operating the shaft from the axle of the machine.

3. In a boll weevil catching machine, the combination, with drums, and drum-heads having an opening covered by gauze, of a wheel revolved in each of said heads, brushes on the wheels to engage the gauze, brushes on the face of the drums to engage the wheels, and means for operating the wheels.

4. In a boll weevil catching machine, the combination, with drums, and drum-heads having an opening covered by gauze, of a wheel having gauze on one side thereof and brushes on the other side for cleaning the drum-heads, brushes in the said heads for cleaning the wheel-gauze, and means for revolving the wheel.

5. In a boll-weevil catching machine the combination, with a pair of fan-casings, a pair of drums each having an open end and the other end connected to one of the casings, a fan for each casing, and insect induction pipes to the casing, of a pair of wheels one in each drum-head, a shaft common to both drums, means for operating the fans, and means for operating the drum shaft simultaneously with the fans.

6. In a boll weevil catching machine, a suction apparatus comprising a fan-shaft, a fan on each end of the shaft, an independent casing for each fan, a discharge pipe extending forwardly from the periphery of each casing, a weevil pipe projecting centrally from one side of each casing opposite the draft ends and extending rearwardly, suction pipes connected with the said weevil pipes, flexible connections for suspending the suction pipes, flexible means for controlling the movement of the suction pipes, and means for driving the fan-shaft from the axle of the machine.

7. In a boll weevil catching machine, the combination, with a pair of fan-casings, a weevil pipe projecting from one side of each casing and terminating in branch pipes, of pipes having a flexible connection with the branch pipes and depending from the latter in pairs, springs to limit the backward movement of the depending pipes, and hand cords for directing the upward and forward movement of the depending pipes.

8. In a boll weevil catching machine, the combination, with a pair of fan-casings having suitable fans therein, a fan-shaft common to both casings and having a pulley between the casings, a pipe projecting from each casing opposite the ends of the shaft and adapted to conduct the weevil into the casings, and means to drive the shaft from the axle of the machine, of a separate drum for each casing, pipes connecting one end of the drums with the casings and adapted to carry the weevil into the drums, drum-heads through which the weevil are discharged from the drums, a brush-wheel revolved in each drum-head, and a driven shaft for revolving said wheels.

In witness whereof we hereunto set our hands in the presence of two witnesses.

WILLIAM M. McCURDY.
ROBT. J. McCURDY.

Witnesses:
W. H. WAMSLEY,
K. LOCKETT.